United States Patent [19]

Sundberg et al.

[11] Patent Number: 4,534,865

[45] Date of Patent: Aug. 13, 1985

[54] METHOD AND APPARATUS FOR REDUCING LEVELS OF ORGANICS IN LIQUIDS

[76] Inventors: Donald C. Sundberg, 21 Garrison La., Madbury, N.H. 03820; Paul L. Bishop, 16 Granger Dr., R.F.D. #1, Durham, N.H. 03824; David G. McBee, 15 Cardiff Rd., Nashua, N.H. 03062

[21] Appl. No.: 604,571

[22] Filed: Apr. 24, 1984

[51] Int. Cl.³ ............................................. C02F 1/28
[52] U.S. Cl. ..................... 210/692; 210/694; 210/90; 210/132; 210/284
[58] Field of Search ............... 210/663, 669, 692, 694, 210/132, 284, 90

[56] References Cited

U.S. PATENT DOCUMENTS 3,283,902 11/1966 Farris et al. ..................... 210/132
3,408,289 10/1968 Gustafson ........................ 210/694
3,985,648 10/1976 Casolo ............................. 210/694

Primary Examiner—Ivars Cintins
Attorney, Agent, or Firm—Robert Shaw

[57] ABSTRACT

Apparatus for reducing levels of organic contaminants present in water or other fluid. The apparatus includes a plurality of spaced activated carbhon beds and a bed of cross-linked organic polymer particles (i.e., Imbiber Beads). The bed of polymer particles is serially disposed between the activated beds of carbon to receive and absorb organic contaminants when all the adsorption sites on the first activated carbon bed reach saturation. A second activated carbon bed receives and adsorbs contaminants which escape the absorption of the polymer particles. The polymer particles swell on contact with organic contaminants to decrease and then terminate flow of water or other fluid through the apparatus.

10 Claims, 4 Drawing Figures

DIRECTION OF FLOW

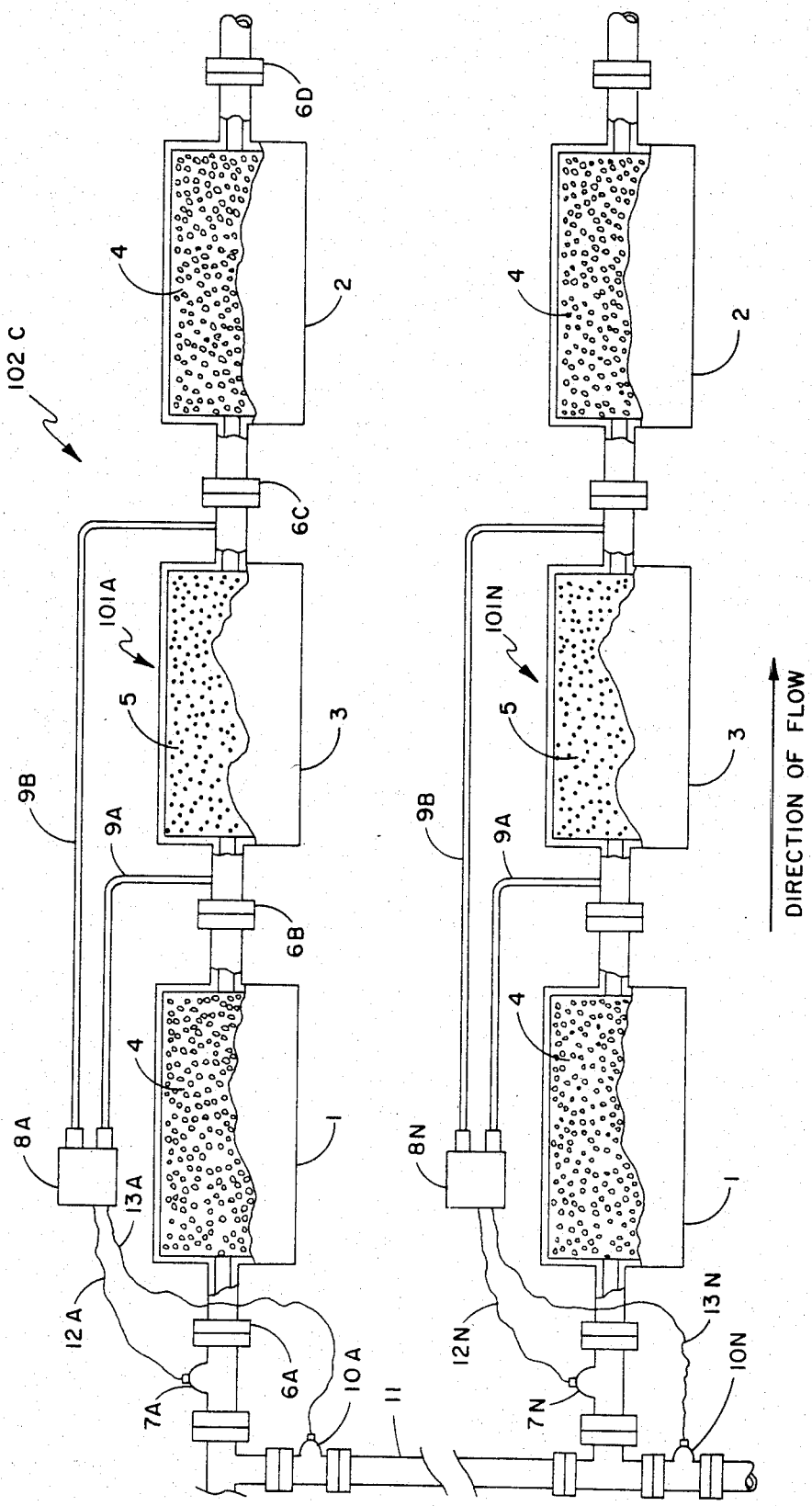

METHOD AND APPARATUS FOR REDUCING LEVELS OF ORGANICS IN LIQUIDS

BACKGROUND OF THE INVENTION

The present invention relates to a novel apparatus for reducing levels of organic pollutants present in groundwater or other fluid.

Attention is called to U.S. Pat. Nos. 2,203,690; 3,520,806; 3,686,827; 3,750,688; 3,869,382; 3,881,295; 3,958,590; 3,999,653; 4,024,882; 4,155,849; 4,168,228; 4,172,031; 4,182,677; 4,302,337; and 4,248,705.

SETTING OF THE INVENTION

The problem of groundwater contamination with toxic organic compounds has come to the forefront of environmental engineering in recent years. (The emphasis herein is on removal of contaminants from groundwater, but, as is noted, the invention can be used to remove contaminants from other liquids and gases.) Over 50 million tons of hazardous waste are currently being generated per year, 90 percent of which has been disposed of improperly, This has been going on for many years so that there are at present 50,000 known hazardous waste dump sites in the United States, and 190,000 open pits, ponds and lagoons used for storage of hazardous waste. Toxic organic wastes from many of these sites have leached into groundwaters making them unfit for almost any conceivable use. Groundwaters may also become contaminated following accidental spills of toxic materials. Often, evidence of groundwater contamination can be found at a considerable distance from the contamination source because of the movement of the groundwaters.

To overcome these problems, groundwater wells are often constructed so that the contaminated water can be pumped from the ground, preserving uncontaminated surrounding areas. The pumped water often contains relatively low concentrations of the contaminants, but levels which are still too high for general release into the environment without prior treatment to reduce the concentrations of the contaminants.

In many cases the only viable form of treatment which will lower the concentration of hazardous organics in groundwater to acceptable levels is activated carbon adsorption. This process is usually quite effective and produces a water of acceptable enough purity for surface discharge or groundwater reinjection. The activated carbon can be contained in a packed column through which the water passes or in a disposable cartridge. In either case, there are potential problems with possible fouling of the activated carbon by contaminants in the water and with detection of breakthrough (loss of pollutants because of saturation of adsorption sites on the carbon) which allows contaminants to escape.

The existing practice in utilizing activated carbon adsorption has been to periodically sample water exiting from these filters and then run costly analyses on the samples using sophisticated devices, such as gas chromatographs, to determine when breakthrough is near or has occurred. While the method is operational, it does necessitate having costly equipment available, skilled personnel to sample and run the analysis, frequent sampling, and, of course, very high costs.

The present invention overcomes the problems in the previous practice by disposing a bed of cross-linked organic polymer particles between two beds of activated carbon or any other material(s) capable of providing such adsorption. According to the present teaching the cross-linked organic polymer particles present an effective means to detect when breakthrough has occurred. These beads respond, upon being exposed to organic contaminants, to decrease and then terminate flow of contaminated water from a first activated carbon to a second activated carbon bed. Due to the relatively low concentration levels of contaminants, the short residence time in contact with the cross-linked organic polymer particles, and the rate at which the cross-linked organic polymer particles swell, some contaminants may reach the second activated carbon bed before the polymer particles terminate flow. The second activated carbon bed is present to adsorb these contaminants, thus allowing only cleaned water to be discharged. This approach allows for a more effective method of reducing levels of organic contaminants present in groundwater, and reduces the need of the past costly practice.

OBJECTIVES OF THE INVENTION

Accordingly, it is an objective of the present invention to provide a filter bed apparatus for reducing levels of organic contaminants present in water or other fluid.

Another objective is to provide an apparatus which signals when the filtering beds in the apparatus are in need of changing.

Still another objective is to provide apparatus which will need few skilled personnel to utilize it.

These and still further objectives will become apparent hereinafter.

SUMMARY OF THE INVENTION

The foregoing objectives are achieved in apparatus for reducing levels of organics present in water (or other fluids) that includes a plurality of spaced activated carbon beds, which beds receive contaminated water, adsorb the organic contaminants in the water and pass the water on, and absorption means disposed in a serial configuration between the beds of activated carbon, to respond, upon being exposed to organic contaminants, to decrease and then terminate flow of contaminated water from the first activated bed of carbon to the second activated bed of carbon.

BRIEF DESCRIPTION OF THE DRAWING

FIG. 4 is a diagrammatic representation of a parallel system of serially-connected beds as in FIGS. 1-3, for connection to a contaminated water intake.

DETAILED DESCRIPTION OF THE INVENTION

Figure 1:
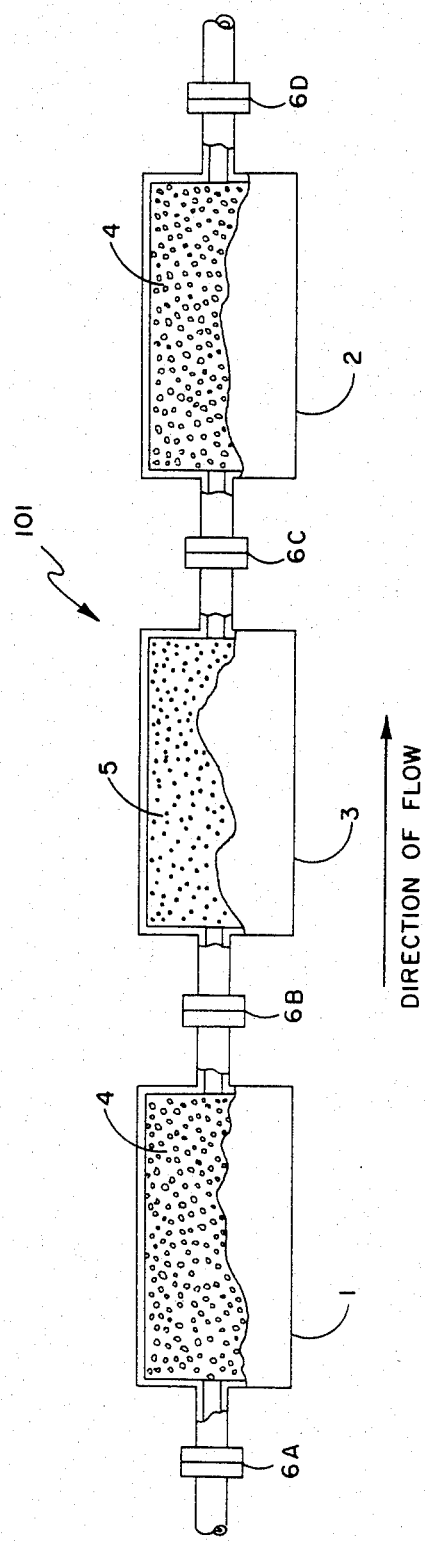
FIG. 1 is a diagrammatic representation of apparatus consisting of two beds of activated carbon and a bed of cross-linked organic polymer (e.g., Imbiber Beads marketed by EMCO, Inc. of Little Rock, Ark.) disposed therebetween in a serial configuration to remove contaminants from water (or other fluid).

Turning now to FIG. 1, an assembled unit 101 is shown consisting of activated carbon beds 1 and 2 (containing particles 4) and an absorption bed 3 of particles 5 (e.g., a bed of Imbiber Beads or other particles of a cross-linked organic polymer) disposed in a serial configuration between the beds 1 and 2. (Hereinafter emphasis is placed on Imbiber Beads in the bed 3.) The activated carbon bed 1 receives contaminated water, adsorbs the contaminants therein, and passes the cleansed water therethrough to the absorber bed 3 and thence to the second activated carbon bed 2. When the adsorption sites on the activated carbon bed 1 are nearly exhausted, organic contaminated water begins to pass from the activated bed 1 to the bed 3 of Imbiber Beads. The absorption particles in the bed 3 upon contacting the organic contaminants respond, absorbing the organic contaminants. Imbiber Beads, for example, absorb up to twenty seven volumes of contaminants for each bead volume. Upon absorption the Imbiber Beads swell, decreasing and ultimately terminating the flow of contaminated water therethrough. The speed of swelling and the ultimate termination of contaminated water flow to the second activated carbon bed 2 depends on the relative concentrations of organic contaminants and other variables of apparatus construction. Organic contaminants may slip through the absorption bed 3 and reach the second activated carbon bed 2. The second activated carbon bed 2 stands ready to accept the contaminated water, adsorb the contaminants therein, and thus discharge water of acceptable purity. This arrangement is key to the invention because it thus allows the time necessary for the Imbiber Beads to respond, expanding effectively to terminate flow of contaminated water completely. Any or all of the beds 1, 2 and 3 can be disassembled from the unit 101 by appropriate couplers 6A–6D.

Figure 2:
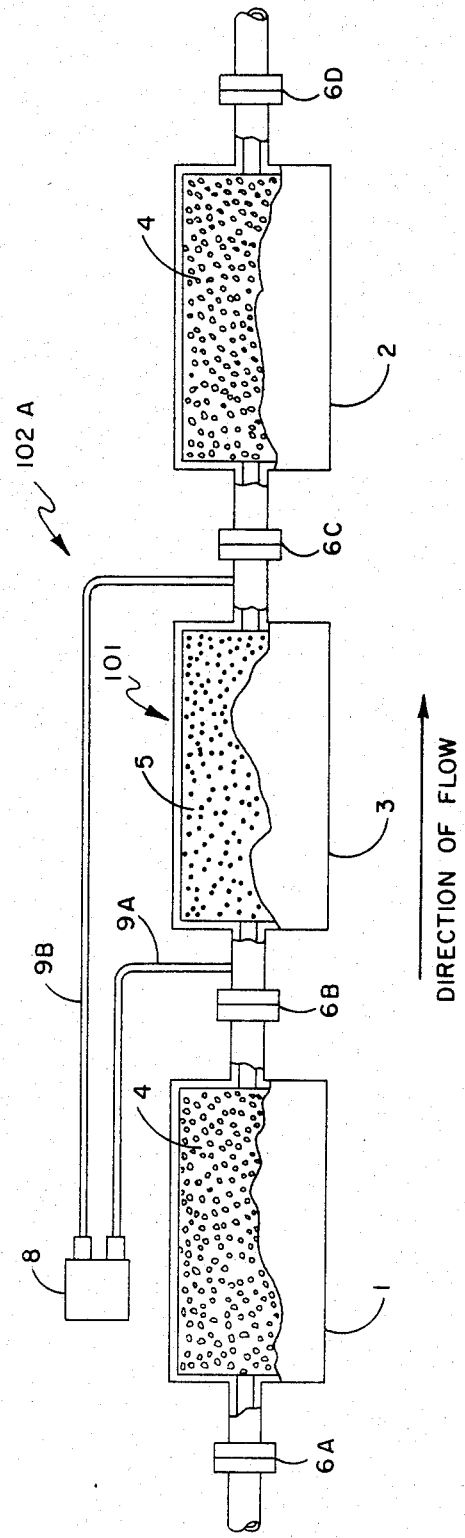
FIG. 2 is a diagrammatic representation of the apparatus in FIG. 1 with a sensing device.

The system marked 102A in FIG. 2 includes an assembled unit again designated 101 plus a sensing device 8 to detect changes in pressure of water flowing through the system. The device 8 receives water pressure signals through tubes 9A and 9B which are connected between the Imbiber Bead bed 3 and the beds 1 and 2, respectively; however, one skilled in the art will recognize that the tubes 9A and 9B can be placed in other locations and still perform their functions.

Figure 3:
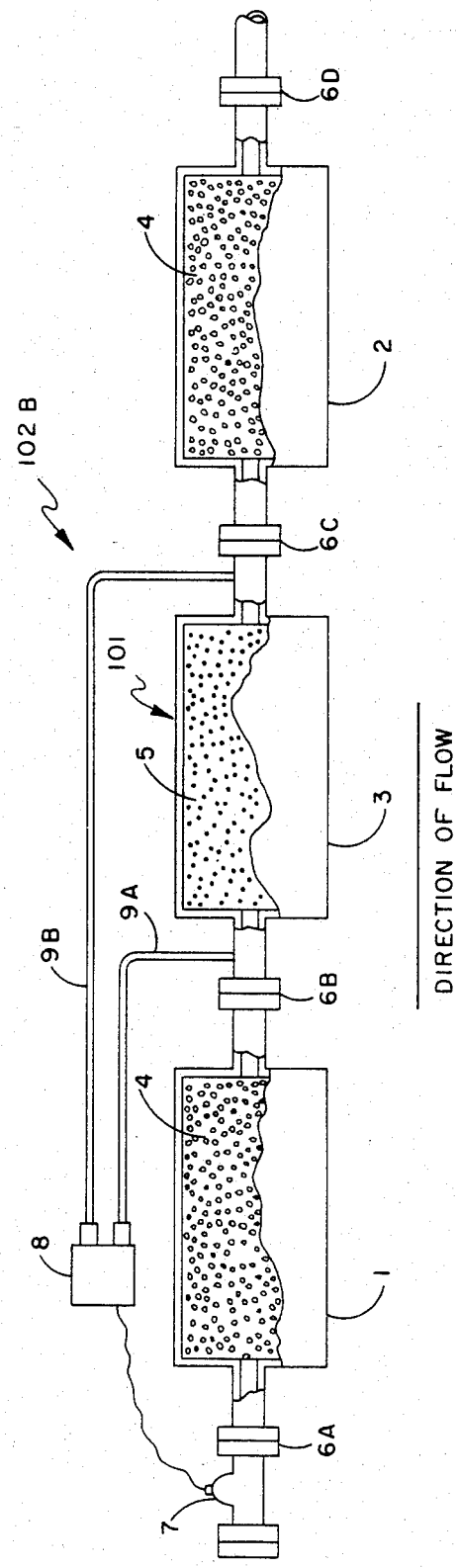
FIG. 3 is a diagrammatic representation of the apparatus of FIG. 1 in which the sensing device activates a valve which terminates the contaminated water intake.

The system marked 102B in FIG. 3 is a modified version of the apparatus in FIG. 2. In this configuration, the sensing device 8 is preset to activate an automatic shutoff valve 7 when the pressure of water changes a predetermined amount. It is understood again that the device 8 can be placed in other positions within the apparatus. The pressure the device 8 senses is, of course, in response to the subsequent swelling of the Imbiber Beads in the bed 3, due to exposure of organic contaminants to the Beads.

The system designated 102C in FIG. 4 is a parallel system of N serially-connected assembled units 101A . . . 101N, connected to receive contaminated water from a manifold 11. The system includes valves 7A . . . 7N and further valves 10A . . . 10N, all of which are controlled by sensing devices, like the device 8 in FIG.3, that are labeled 8A . . . 8N in FIG. 6 (see control wires 12A . . . 12N and 13A . . . 13N). Briefly, initially the valves 7A . . . 7N are open and the valves 10A. . . . 10N are closed. When the sensing device 8A closes the valve 7A, it opens the valve 10A, diverting flow from the serial unit 101A in FIG. 4 to the serial unit 101N. The sequence of events is such that the liquid flow can be diverted to any number of serial units 101A . . . providing time to permit replacement of exhausted beds. Other logical configurations to perform the functions just described can be employed. It will be appreciated that the system in FIG. 4 can have more than two parallel-connected units 101A . . . but that, in a two-unit system, the units can be operated in a flip-flop or alternating mode.

It is envisioned, as above indicated, that the present apparatus will be constructed such that the beds of activated carbon and Imbiber Beads will be replaceable. It is also understood that the Imbiber Bead composition, a lightly cross-linked polymer, usually of alkystyrene polymer particles, will be the primary material of choice in the absorption bed. However, changes can be made in the polymer composition to change the range of organic contaminants that can be dealt with. Also, the relative volumes in the beds 1, 2 and 3 must be chosen to provide proper residence times for the fluid in the beds 1 and 2 and a proper expansion time for the polymer particles in the bed 3 to achieve the foregoing results.

Further modifications of the invention herein disclosed will occur to those skilled in the respective arts and all such modifications are deemed to be within the scope of the invention as defined by the appended claims.

What is claimed is:

1. Apparatus for reducing levels of organic contaminants present in flowing contaminated water and for automatically terminating the flow of the contaminated water, which comprises:

a. a first activated carbon bed and a second activated carbon bed serially connected and spaced from one another to receive contaminated water, adsorb organic contaminants therein, and then pass the cleansed water therethrough, and b. absorption means comprising an absorption bed of given volume disposed between the first activated carbon bed and the second activated carbon bed, responding, upon being exposed to organic contaminants in the water, by absorbing any contaminants that pass through the first activated carbon bed and swelling within said given volume because of the absorption of the contaminants to decrease flow of contaminated water from the first activated carbon bed to the second activated bed and ultimately to fill the given volume and terminate the flow of the contaminated water, the relative volumes of the serially connected spaced activated carbon beds and the absorption bed being chosen to provide proper residence times for the water in the spaced activated carbon beds and a proper expansion time for the particles in the absorption bed to decrease the flow and ultimately to terminate the flow from the first activated carbon bed to the second activated carbon bed upon exhaustion of the first activated carbon bed.

2. Apparatus as claimed in claim 1 wherein said apparatus includes sensing means for determining change in water pressure, said sensing means giving signal when pressure reaches a predetermined level.

3. Apparatus as claimed in claim 2 that includes valve means and wherein said sensing means is a back pressure meter, said meter being preset to activate the valve means to terminate flow of contaminated water.

4. Apparatus as claimed in claim 3 wherein said sensing means activates the valve means to divert contaminated water flow into an identical parallel path.

5. Apparatus as claimed in claim 1 wherein said absorption means are particles of a cross-linked organic polymer.

6. Apparatus as claimed in claim 1 wherein said absorption means are alkystyrene polymer particles.

7. A method of reducing levels of organic contaminants present in water, which comprises:
   a. passing contaminated water through a plurality of spaced activated carbon beds; and
   b. disposing between said spaced plurality of activated carbon beds an absorber bed of polymer particles which, upon contacting organic contaminants, decreases flow of contaminated water from the first bed of said plurality of spaced activated carbon beds to a second bed thereof to prevent contaminated input water from reaching the output of the second bed.

8. A method as claimed in claim 7 wherein the polymer particles are a cross-linked organic polymer, wherein the residence time of the contaminated water in the combination of the first bed and second bed is maintained long enough for removal of substantially all the organic contaminants and wherein the absorber bed of polymer particles is configured in a manner that effects a required decrease in flow therethrough when contacted by the organic contaminants.

9. Apparatus for reducing levels of organic contaminants in a fluid, which comprises:
   a. adsorption means comprising a plurality of spaced adsorption beds to receive the contaminated fluid, adsorb organic contaminants therein and then pass the cleansed fluid therethrough, and
   b. absorption means disposed between said plurality of spaced adsorption beds in a serial configuration to respond upon being exposed to the organic contaminants, to decrease flow of contaminated fluid from a first adsorption bed to a second adsorption bed of said plurality and, ultimately, automatically to terminate flow from the first adsorption bed to the second adsorption bed when the first adsorption bed becomes exhausted.

10. Apparatus for reducing levels of organic contaminants present in a fluid, that comprises:
   a. two activated carbon beds to receive contaminated fluid, adsorb organic contaminants therein, and then pass the cleansed fluid therethrough; and
   b. absorption means serially connected between the two activated carbon beds to receive fluid from the first of the two activated carbon beds and responding, upon being exposed to organic contaminants therein, to decrease and then automatically terminate flow of contaminated fluid from the first activated bed to the second of the two activated carbon beds, said absorption means comprising cross-linked polymer particles that absorb contaminants that pass through the first bed and swell, as a result of such absorption, the swelling of the cross-linked polymer particles serving to decrease and ultimately to terminate the flow of the contaminated fluid through the absorption means from the first carbon bed to the second carbon bed.

* * * * *

UNITED STATES PATENT AND TRADEMARK OFFICE
CERTIFICATE OF CORRECTION

PATENT NO. : 4,534,865
DATED : August 13, 1985
INVENTOR(S) : Donald C. Sundberg; Paul L. Bishop; David G. McBee It is certified that error appears in the above-identified patent and that said Letters Patent are hereby corrected as shown below:

Assignee:   University of New Hampshire
                    Durham, New Hampshire In the Abstract, line 3, change "carbhon" to: --carbon--; Abstract, line 4, change "i.e.," to: --e.g.,--.

Signed and Sealed this

Tenth Day of December 1985

[SEAL]

Attest:

DONALD J. QUIGG

Attesting Officer           Commissioner of Patents and Trademarks